United States Patent
Len

[11] Patent Number: 5,636,407
[45] Date of Patent: Jun. 10, 1997

[54] WIPER DEICING DEVICE FOR VEHICLES AND METHODS OF CONSTRUCTING AND UTILIZING SAME

[76] Inventor: Adolf Len, 28328 Golf Pointe Blvd., Farmington, Mich. 48331

[21] Appl. No.: 570,345

[22] Filed: Dec. 11, 1995

[51] Int. Cl.⁶ ............................. B60S 1/40; B60S 1/04
[52] U.S. Cl. ..................... 15/250.19; 15/250.32; 15/250.351
[58] Field of Search ............... 15/250.19, 250.001, 15/250.351, 250.352, 250.202, 250.21, 250.23, 250.32, 250.16, 250.17, 246

[56] References Cited

U.S. PATENT DOCUMENTS

| | | | |
|---|---|---|---|
| 2,717,408 | 9/1955 | Le Page | 15/250.19 |
| 2,784,438 | 3/1957 | Petersen | 15/250.19 |
| 3,163,877 | 1/1965 | Wubbe | 15/250.32 |
| 3,453,679 | 7/1969 | Thorlakson | 15/250.23 |
| 4,053,179 | 10/1977 | Jorgenson et al. | 15/250.32 |
| 5,469,595 | 11/1995 | Dara | 15/250.19 |
| 5,487,204 | 1/1996 | Nelson | 15/250.19 |

FOREIGN PATENT DOCUMENTS

| | | | |
|---|---|---|---|
| 522338 | 1/1993 | European Pat. Off. | 15/250.203 |
| 880864 | 5/1953 | Germany | 15/250.19 |
| 3731921 | 12/1988 | Germany | 15/250.34 |
| 3736049 | 5/1989 | Germany | 15/250.203 |
| 4235395 | 4/1994 | Germany | 15/250.19 |
| 95234 | 6/1982 | Japan | 15/250.19 |
| 85150 | 3/1992 | Japan | 15/250.19 |
| 162616 | 6/1993 | Japan | 15/250.19 |

*Primary Examiner*—Gary K. Graham
*Attorney, Agent, or Firm*—Weiner, Carrier & Burt, P.C.; Joseph P. Carrier; Irving M. Weiner

[57] ABSTRACT

A wiper deicing device for a vehicle is disclosed which comprises a mechanism for resiliently impacting the window wiper against the window, including a reciprocatable member operatively engagable with the wiper, and a mechanism for stabilizing movement of the reciprocatable member. The impacting means includes either a manual or powered actuator for cyclically moving the reciprocatable member between extreme positions thereof, corresponding to a position in which the wiper is engaged with the window and a position in which the wiper is disengaged from the window, and will preferably include one of a cam mechanism, a gear mechanism, a crank mechanism and a lever mechanism operatively connected to or engaged with the reciprocatable member. The deicing device also preferably includes a mechanism for limiting pivoting movements of a blade portion of the wiper relative to an arm portion of the wiper for thereby distributing a lifting force of the reciprocatable member across a length of the wiper blade.

12 Claims, 5 Drawing Sheets

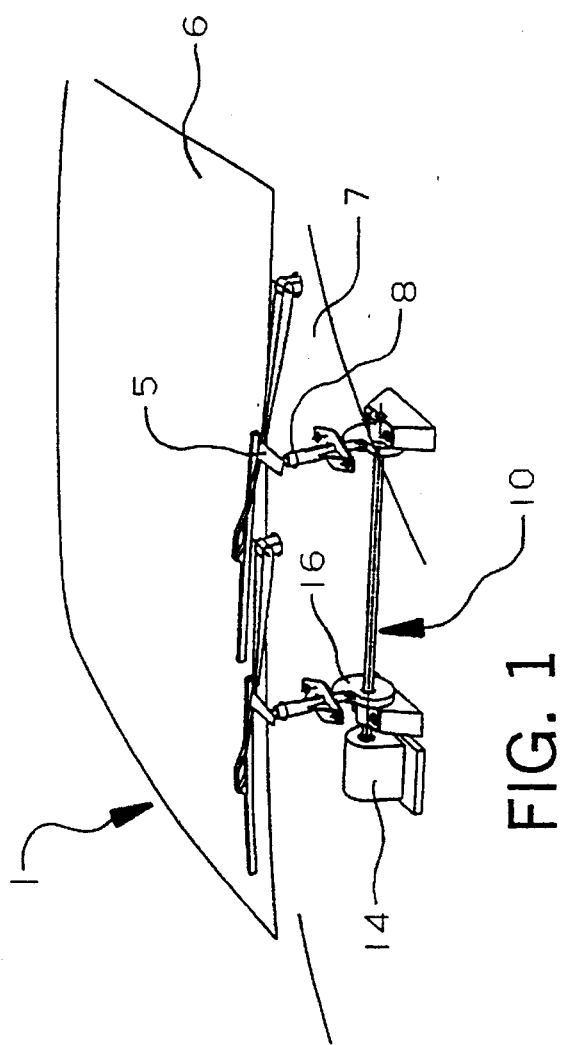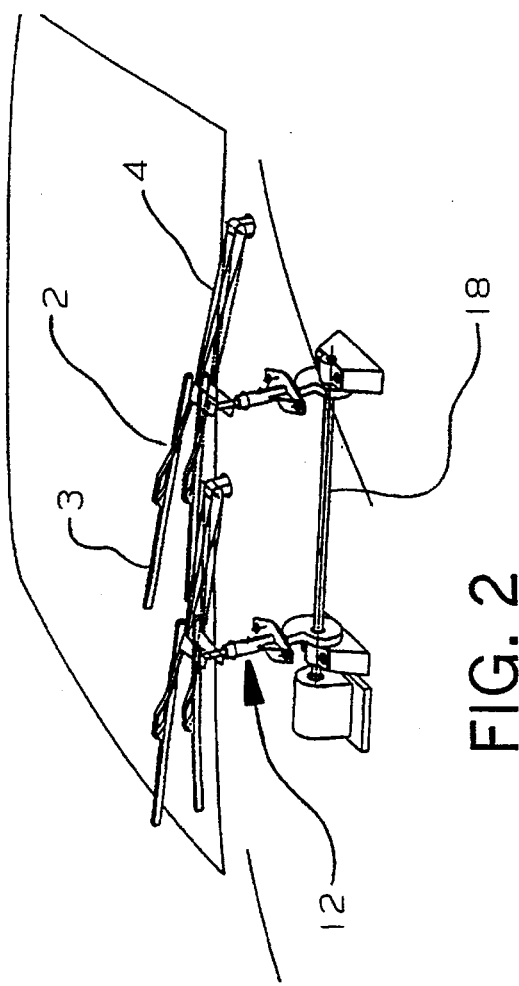

WIPER DEICING DEVICE FOR VEHICLES AND METHODS OF CONSTRUCTING AND UTILIZING SAME

BACKGROUND OF THE INVENTION

1. Field of the Invention

The present invention pertains to a wiper deicing device for vehicles, and to methods of contracting and utilizing same. More particularly, the invention pertains to a novel device for quickly and reliably removing ice build up from vehicle window wipers while the vehicle is traveling by raising and impacting the wipers against the window in a rapid, cyclical manner.

2. Discussion of Relevant Art

In the art of vehicle wipers, there are many known devices which address ice formation and build up on window wipers for overcoming problems associated therewith. For example, there are many known devices for heating wiper blades to prevent ice formation thereon and/or melt ice that has formed thereon, including deuces disclosed in U.S. Pat. Nos. 4,928,345 (Meltzer), 4,928,344 (Bliss) 3,489,884 (Waseleski), 3,461,477 (Ikner) and 3,201,818 (Linker). Although the devices are somewhat effective for preventing and eliminating ice formation on window wipers, they are not completely effective especially in situations of heavy snow and ice deposits, and otherwise there is time delay involved for heating up the wipers and for melting ice which has formed.

Additionally, there are known devices for variably adjusting a wiping pressure of a wiper against the window surface such as disclosed in U.S. Pat. Nos. 5,056,182 (Fukumoto et al.) and 4,993,102 (Honda et al.), which include a powered mechanism for changing the wiping pressure based on vehicle speed, location of the wiper stroke, a driver's desire, etc. Such wiper pressure adjusting devices do not address the problem of ice formation and build up onto wipers.

Still further, there are devices as disclosed in U.S. Pat. Nos. 5,008,971 (Stewart, Sr.), and 2,337,879 (Folberth et al.) which are used for selectively maintaining a wiper in engagement or out of engagement with a window surface. The Folberth Patent specifically is designed to maintain a wiper out of contact with the window except during actual use thereof on a high speed vehicle such as an airplane or water craft to minimize deterioration of the wiper blade and prevent freezing of the wiper blade to window surface, and includes a manual mechanism which forcibly moves the wiper into engagement with the windshield surface when desired. Again, however, the devices disclosed in these patents are not intended to remove ice as formed and built up on the wipers.

The present invention has been developed to overcome the adequacies and other limitations of known devices for eliminating or removing ice formation on window wipers, and to generally fulfill a great need in the art for rapidly and reliably removing ice and snow from window wipers under any condition.

SUMMARY OF THE INVENTION

According to the present invention there is provided a wiper deicing device for a vehicle having a window and a window wiper, comprising means for resiliently impacting the window wiper against the window, including a reciprocatable member operatively engagable with the wiper, and means for stabilizing movement of the reciprocatable member. The impacting means preferably includes actuating means for moving the reciprocatable member to cyclically disengage the wiper from the window and reengage the wiper with the window, and most preferably includes a powered actuating means which disengages the wiper from the window at a first rate and reengages the wiper with the window at a second, higher rate.

The wiper deicing device according to the invention also preferably includes means for distributing a force of the impacting means across a longitudinal length of the wiper to assure efficient, uniformed removal of ice, as well as a relatively large engagement member provided on either the wiper or the reciprocatable member for facilitating engagement between the wiper and the reciprocatable member.

It is an object of the present invention to provide a wiper deicing device which functions rapidly and efficiently to remove ice from a window wiper so as to assure reliable operation of the wiper and a clear, safe view through the window.

It is another object of the invention to provide such a wiper deicing device which may be conveniently actuated within the passenger compartment of the vehicle, either in a powered manner or through manual actuation.

It is still another object of the invention to provide a wiper deicing device which is durably reliable and does not detrimentally affect normal use of the wipers.

Other objects, advantages and salient features of the invention will become apparent from the following detailed description which, when taken in conjunction with the annexed drawings, discloses preferred embodiments of the invention.

BRIEF DESCRIPTION OF THE DRAWINGS

FIG. 1 is a front perspective view of a first preferred embodiment of the invention including powered actuating means and a cam mechanism for raising and lowering the window wipers, some elements of a vehicle structure being partially shown to facilitate understanding of the invention.

FIG. 2 is a front perspective view similar to FIG. 1, but also showing different operative positions of the wiper as removed by the deicing device.

DETAILED DESCRIPTION OF PREFERRED EMBODIMENTS

Figure 3:
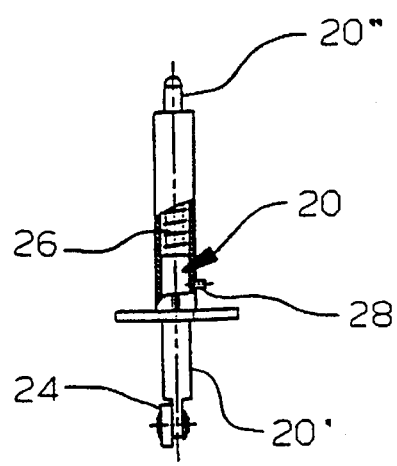
FIG. 3 is an enlarged, from elevational view of a reciprocatable member and a stabilizing guide means of the wiper deicing device of FIG. 1.

Referring to FIGS. 1–5, there is shown a wiper deicing device 1 according to a preferred embodiment of the invention, and disposed on a vehicle for use in relation to the vehicle's front windshield wipers 2. The deicing device 1 generally comprises means 10 for impacting the blade portions 3 of the wipers 2 against the windshield 6 and means 12 for stabilizing movement of the impacting means 10 relative to the wipers 2. As depicted, the impacting means 10 preferably includes a motor 14, a pair of cams 16 mounted on an output shaft 18 of the motor and reciprocatable members 20 operatively disposed between the cams 16 and projecting engagement members 5 provided on arm portions 4 of the wipers 2 for engaging same. The stabilizing means 12 generally includes guide brackets 22 for guiding linear movements of the reciprocatable members 20 along longitudinal axes thereof, respectively. The motor 14, cams 16, output shaft 18 and guide brackets 22 are mounted in fixed positions to portions of the vehicle body beneath the hood 7 thereof such that the deicing device is completely concealed from view during normal use except for the projecting engagement members 5 on the wiper arms 4, and upper portions of the reciprocatable members 20 and the guide brackets 22 which project through small openings 8 in the hood surface.

In FIG. 1, the wipers 2 are shown in lowered, window-engaging positions thereof, while in FIG. 2 the wipers 2 are shown by solid lines in their raised positions out of engagement with the windshield 6, and with broken lines in their lowered, window-engaging positions.

Figure 4:
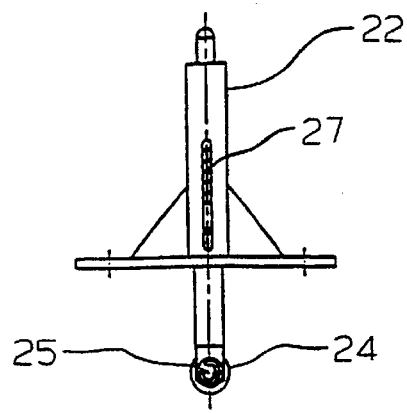
FIG. 4 is a side elevational view of FIG. 3.
Figure 5:
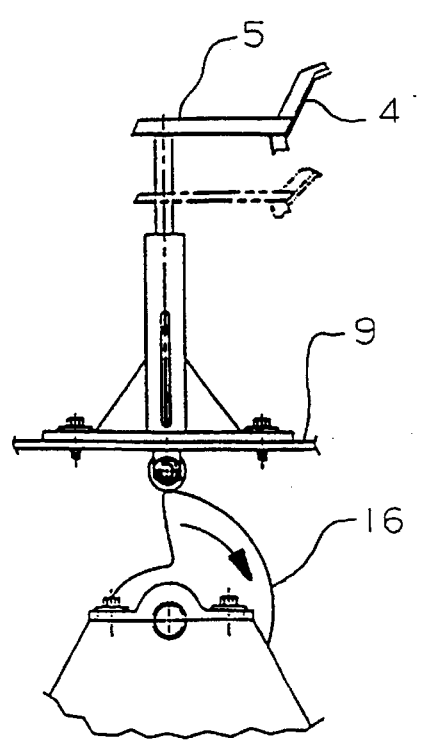
FIG. 5 is a side elevational view of the reciprocatable member and the stabilizing guide means of FIG. 4 in operative engagement with a cam mechanism of the wiper deicing device of FIG. 1, the reciprocatable member being shown in operative engagement with a modified wiper according to the invention, and the modified wiper being shown in its raised and lowered positions by solid lines and broken lines, respectively.

Referring specifically to FIGS. 3–5, additional details of the reciprocatable members 20, the guide members 22 and the cams 16 are revealed. Each of the reciprocatable members 20 is generally shaped as an elongate rod or pin having a lower half portion 20' with an outer diameter or width which is slightly smaller than an inner diameter or width of the guide bracket 22 such that the lower half portion 20' is smoothly guided for linear movement by the inner surface of the guide bracket 22, and an upper half portion 20" with a reduced diameter or width. Each of the reciprocatable members 20 also includes a rolling mechanism provided at a lower end thereof for rolling engagement with the surface of a corresponding cam 16. As depicted, the rolling mechanism preferably includes a wheel 24 rotatably connected to the lower end of the reciprocatable member 20 by a pin 25. Each guide bracket 22 preferably includes a main cylindrical portion through which the reciprocatable member is disposed such that the lower half portion 20' of the reciprocatable member projects beneath the bracket 22 and the upper portion of 20" projects above the bracket 22. An opening of the lower end of the cylindrical portion of the bracket 22 is preferably, just slightly larger than the diameter of the lower portion 20' of the reciprocatable member and the upper end of the cylindrical portion of the bracket 22 is preferably just slightly larger than the diameter of the upper portion 20" of the reciprocatable member 20 to minimize entry of foreign matters within the cylindrical portion. Additionally, bushing (s) may be provided .between the reciprocatable member 20 and a cylindrical portion of the bracket 22, and/or a lubricant such as a polytetrafluroethylene coating may be provided on the outer surface of the reciprocatable member 20 and/or the inner surface of the cylindrical portion of the bracket 22. A biasing means such as the depicted coil spring 26 is preferably provided about the upper portion 20" of the reciprocatable member 20 and confined within the cylindrical portion of the bracket 22 such that the reciprocatable member 20 is normally urged downwardly by the spring 26 such that the wheel 24 is always maintained in contact with the cam 16.

The guide bracket 22 also preferably includes an elongate slot 27 defined in a side wall thereof and extending longitudinally along an intermediate section of the cylindrical portion of the bracket; while the reciprocatable member is preferably provided with a projecting member such as the pin 28 as shown projecting outwardly of the bracket 22 member through the elongate slot 27. The pin 28 preferably has a diameter slightly smaller than a width of the elongated slot 27 such that the pin 28 is only permitted to slide upwardly and downwardly along the slot 27, and hence the reciprocatable member 20 is prevented from rotating about its longitudinal axis so that the wheel 24 at the bottom of the reciprocatable member is always maintained in proper alignment with the surface of the cam 16. As shown the bracket 22 also preferably includes a lower flange for being mounted to the vehicle body 9 using bolts or other fastening means as shown, and reinforcing portions disposed between the cylindrical portion and flange.

As shown in FIGS. 1, 2 and 5, the cams 16 are preferably fixed to respective portions of the output shaft 18 in an appropriate manner, such as using spline connection, while adjacent portions of the shaft 18 are rotatably supported on bearing brackets which are in turn mounted to appropriate portions of the vehicle body 9, and an end of the shaft 18 is connected to the motor 14.

The projecting member 5 which is engaged by the upper end of the reciprocatable member 20 is preferably a flat planar member rigidly connected to the arm 4 of the wiper 2. The member 5 may be formed integrally with the wiper 2 or subsequently joined thereto. The flat planar nature of the member 5 provides a relatively large area to be reliably engaged by the reciprocatable member 20 and otherwise shields the projecting upper ends of the reciprocatable member 20 and the guide bracket 22 from exposure to contaminants such as rain, snow and dirt, and also from exposure to view for improving the appearance thereof. The member 5 is depicted as being joined at approximately the middle of the wiper arm 4 between an end joined to the wiper blade portion 3 and an end joined to a motor output shaft. Preferably, however, the projecting member will be joined closer to the end of the arm 4 connected to the driving shaft of a conventional driving motor (not shown) so that a relatively small moved distance of the reciprocatable member 20 will translate into a much larger raised distance of the blade portion 3 of the wiper 2 above the windshield 6, and so that the impacting and stabilizing means may be formed with a desirably smaller and compact size.

Although the preferred structure of the wiper deicing device according to the first preferred embodiment has been described above, it will be understood that many variations and modifications may be made to the disclosed structure without departing from the essential characteristics thereof. For example, a plurality of the slots 27 and of the projecting pins 28 may be provided in the bracket 22 and the reciprocatable member 20, or the pin 28 may simply engage a guide groove within the bracket 22 rather than projecting through an opening defined through the bracket; a plurality of wheels 24 or a spherical member may be provided at the lower end of the reciprocatable member 20; a pair of motors 14 may be provided to respectively drive the cams 16; the upper end of the reciprocatable member 20 may directly engage the wiper to so as to eliminate the projecting member 5; the member 5 may be connected to the upper end of the reciprocatable member 20 rather than to the wiper; etc.

Operation of the Wiper Deicing Device

Operation of the wiper deicing device according to the first preferred embodiment of the invention will now be described. With particular reference to FIG. 1, 2 and 5, the wiper deicing device may be actuated by a vehicle operator by actuating a switch (not shown) within the passenger compartment of the vehicle, whereupon the motor 14 is actuated to rotate the output shaft (and hence the cams 16) in a clockwise direction relative to FIG. 5. As each of the cams 16 is rotated, the wheel 24 rolls along the outer surface thereof so that the reciprocatable member 20 is gradually raised higher and higher until the wheel 24 comes to the position shown in FIG. 5 at which the reciprocatable member 20 is raised to its highest position, and with continuing rotation of the cam 16 the wheel 24 and the reciprocatable member 20 relatively rapidly drop to lower most positions thereof along the stepped portion of the cam as urged by the force of the spring 26 and the weight of the wiper. Such raising and lowering of the reciprocatable member 20 continues in a cyclical fashion as long as the motor 14 is actuated to rotate the cam 16. With the raising and lowering of the reciprocatable member 20, a tip of the upper portion 20 engages the lower surface of the projecting member 5 on a wiper arm 4 to correspondingly raise and lower the wiper out of an engagement and into engagement with the windshield 6. The relatively rapid movement of the reciprocatable member from its uppermost position to its lowermost position as it passes over the stepped portion of the cam 16 is important for efficient operation of the invention. The rapid drop of the reciprocatable member also rapidly drops the blade portion 3 of the wiper 2 so as to impact against the windshield 6, thereby quickly breaking up and any ice and snow clinging to the blade portion 3 and freeing the blade portion 3 from the ice and snow in an efficient manner. The reciprocatable member 20 is is urged downwardly by the force of the spring 26 and the weight of the wiper 2 thereon. Preferably, the spring will have a relatively light stiffness so that the motor 14 also need not be of an excessively large size, and preferably the blade portion 3 of the wiper 2 will only be raised a relatively small distance such as 1-4 inches above the windshield so that repeated impacting of the wiper blade will not have any significant, detrimental effect on normal use of the blade portion 3. Although the tip portion of the reciprocatable member 20 is shown as engaging the projecting member when the reciprocatable member is at a lower most position thereof, it is possible that the reciprocatable member be completely disengaged from each projecting member 5 at the lower most position thereof.

Figure 6:
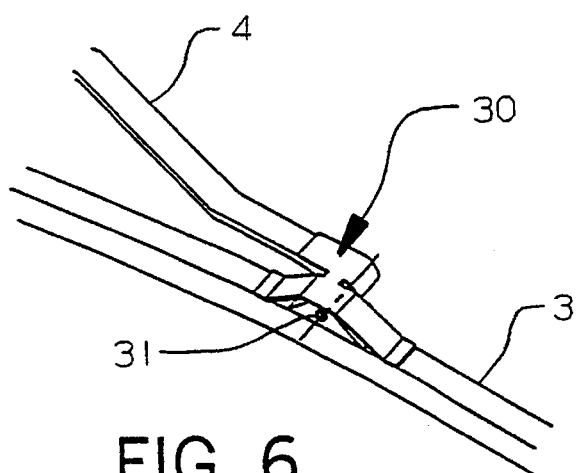
FIG. 6 is a side perspective view of a wiper and wiper arm having a force distributing member according to the invention provided thereon.
Figure 7:
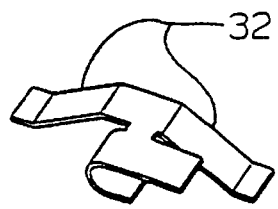
FIG. 7 is a side perspective view of the forced distributing member in FIG. 6.
Figure 8:
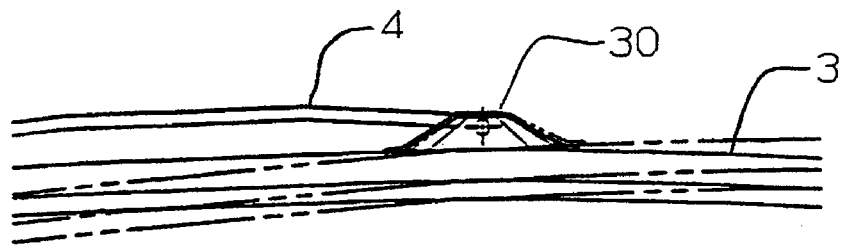
FIG. 8 is a side elevational view of the wiper, wiper arm and forced distributing member of FIG. 6, and including broken lines to indicate the restricted movement of the wiper permitted by the forced distributing member.

Referring to FIGS. 6-8, there is shown a force distributing means 30 which may optionally be used together with any of the disclosed embodiments of the invention. As depicted, the forced distributing means 30 preferably comprises the clip member formed of spring steel, molded plastic, or any other type of appropriate material, and is operatively connected to the blade portion 3 and the arm portion 4 of the wiper 2 at the pivot joint therebetween. The conventional pivot joint on the wiper normally permits the blade portion 3 to freely pivot to a very large extent relative to the arm portion 4. Such freely pivoting action of the blade portion 3 may be undesirable in certain circumstances when the blade portion 3 is lifted away from a window surface, however, such as when only one end of the blade portion is frozen to the window surface. In such a situation the frozen end of the wiper blade may remain connected to the windshield surface while the remainder of the blade portion is lifted from the window surface, and this may warp or bend the blade portion 3. Moreover, the ability of the deicing device according to the invention to efficiently remove ice from a blade portion would be significantly impaired if one end of the blade portion remains frozen to the windshield surface. The force distributing member 30 according to the present invention includes an intermediate portion which receives an end of the wiper portion 4 and a pair of spring arm portions 32 which engage the blade portion 3 of the wiper on opposite sides of the pivot joint 31 between the blade portion and the arm portion 4 for significantly restricting the degree to which the blade portion 3 may pivot relative to the arm portion 4. As is understood from FIG. 8, in which a non-pivoted position of the wiper blade is shown in solid line and a pivoted position of the blade portion is shown in broken lines. The spring arm portions 32 of the forced distributing member 30 function as springs urging the engaged portions of the blade member 3 downwardly.

Figure 9:
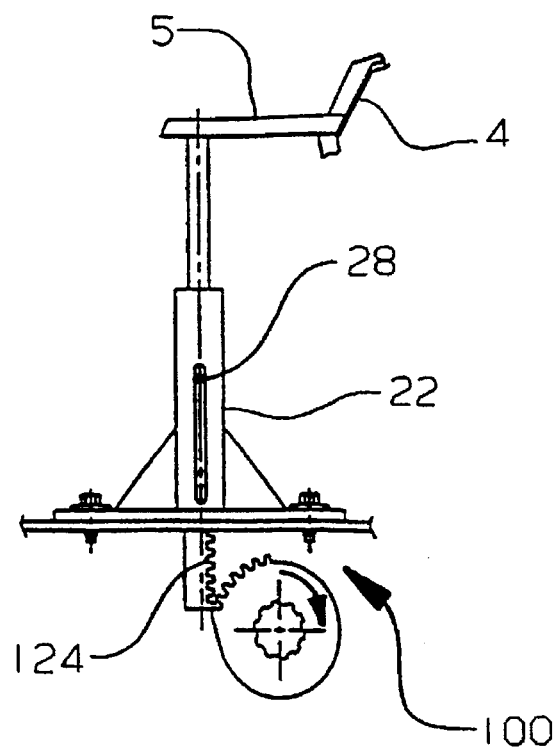
FIG. 9 is a side elevational view similar to FIG. 5, but showing a reciprocatable member and a gear mechanism for driving the reciprocatable member according to a second preferred embodiment of the invention.
Figure 10:
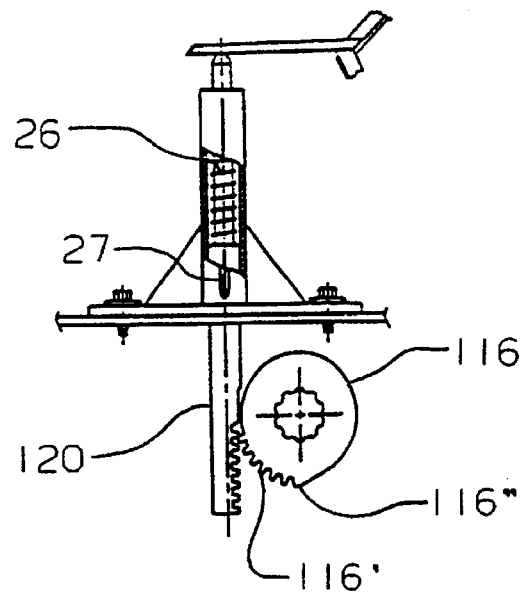
FIG. 10 is a view similar to FIG. 9, but with the reciprocatable member shown in its lowered position and with the stabilizing means shown partially in section to reveal internal structure thereof.
Figure 11:
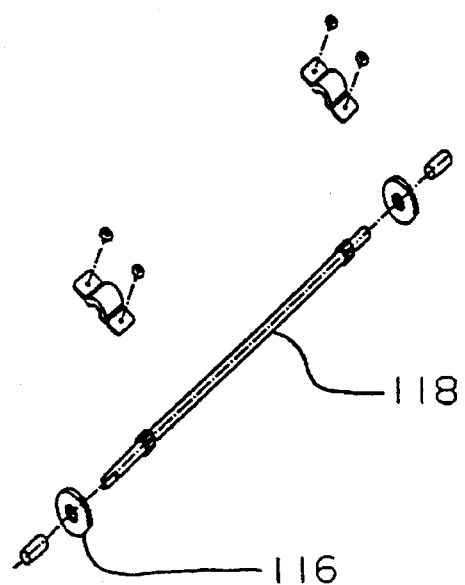
FIG. 11 is an exploded perspective view of portions of the gear mechanism according to the second preferred embodiment of the invention.

Referring to FIG. 9-11, there is shown a wiper deicing device according to a second preferred embodiment of the invention. In the second embodiment, only the structure of the reciprocatable member and the mechanism for driving the reciprocatable member are changed in comparison to the first preferred embodiment of the invention as discussed above, and like components in the second embodiment are referred to by the same reference numbers as in the first preferred embodiment.

In this second preferred embodiment, a reciprocatable member 120 has a rack 124 of gear teeth provided on a lower end thereof and which operatively engage with corresponding teeth 116' on a gear 116 splined to an output shaft 118 of a driving motor (not shown) so that as the gear 116 is rotated in the clockwise direction in FIGS. 9 and 10, the reciprocatable member will be cyclically driven upwardly to a raised position as shown in FIG. 9 and released to a lowered position as shown in FIG. 10. More particularly, the gear 116 has teeth 116' provided only on a small portion (approximately ¼) of the outer circumference thereof so that as the gear 116 is rotated, the teeth 116' will initially engage the rack 124 when the reciprocatable member 120 is in a lowered position thereof as shown in FIG. 10, the gear 116 will raise the reciprocatable member 120 to a raised position thereof as shown in FIG. 9 with continuing rotation of the gear, and when the gear rotates beyond the position shown in FIG. 9, the teeth 116' of the gear become completely disengaged from the rack 124 and the reciprocatable member moves downwardly to its lowered position, again by the urging of the spring 26 and the weight of the wiper 2 which is supported on the upper tip of the reciprocatable member. The last tooth of the gear 116 has a tapered side surface 116" to facilitate the downward movement of the reciprocatable member 120 as it moves downward to its lowered position.

In this embodiment, the pin 28 projecting from the reciprocatable member 120 and the slot 27 defined in the bracket 22 function not only to assure alignment of the reciprocatable member, but also function as a stopper for the reciprocatable member when it is in its lowered position and the rack 124 is not engaged with the teeth 116' of the gear 116. Unlike the first embodiment where the rotatable wheel 24 was always in engagement with the surface of the cam 16, the rack 124 of the reciprocatable member 120 according to the second embodiment only engages the gear 116 when the rack 124 engages its teeth 116', and the stopper function of the slot 27 and pin 28 assures that the reciprocatable member will only move so far downward, and will be in its proper position each time the gear is rotated to reengage the rack 124. In this embodiment, it is preferred that the pin 28 be formed with enhanced strength and rigidity compared with the pin 28 of the first embodiment so that the stopper function will be reliably performed over a long period of use.

It is also preferred that the guide rack 22 be formed with a pair of the slots 27 for respectively guiding a pair of pins 28 projecting from the reciprocatable member 120, and for enhanced rigidity and reliability.

Referring to FIG. 11, the output shaft 118 has substantially the same structure as the output shaft 118 of the first embodiment, except that it has a pair of the gears 116 fixed thereto, rather than a pair of cams, for respectively engaging a pair of reciprocatable members 120 associated with a pair of wipers 2.

Operation of the wiper deicing device according to the second embodiment of the invention is substantially the same as operation of the first embodiment. Particularly, when a motor (not shown) is actuated by a switch within the passenger compartment of the vehicle, the output shaft 118 will rotate in a given direction such as clockwise, and the gears 116 will repeatedly raise the reciprocatable members 120 to a position as shown in FIG. 9, and then release the reciprocatable members 120 such that they are rapidly returned to lowered positions thereof as shown in FIG. 10, so that correspondingly the wipers 2 are repeatedly disengaged from the window surface and rapidly returned to impact against the window surface in a cyclic fashion for disengaging any ice that may be adhered to the blade portion 3 of the wipers 2.

Figure 12:
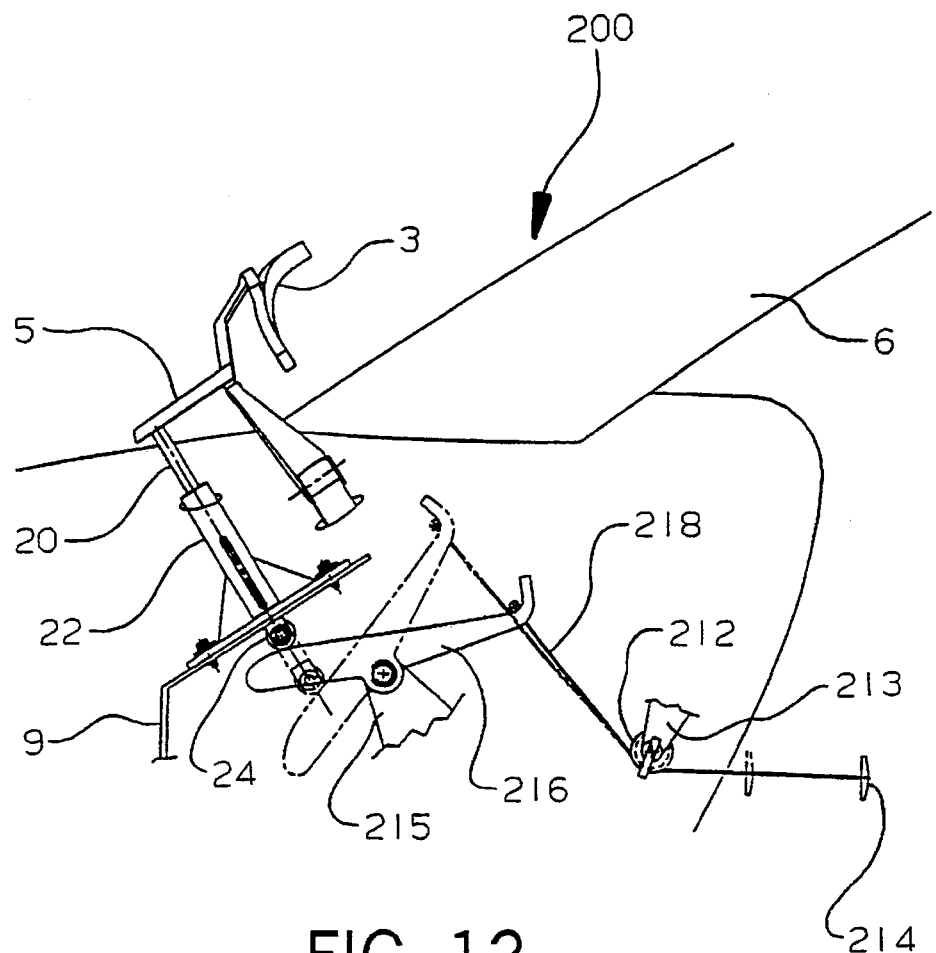
FIG. 12 is a side perspective view of a wiper deicing device according to a third preferred embodiment of the invention, including a manually operable mechanism for raising and lowering the wiper.
Figure 13:
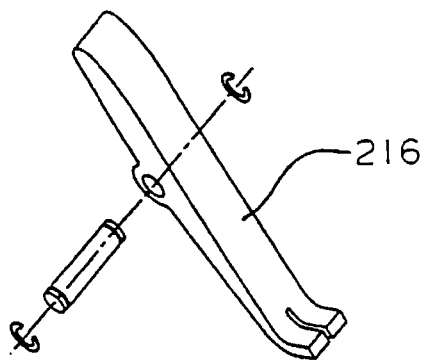
FIG. 13 is an enlarged, perspective view of a pivoting lever member according to the preferred embodiment of the invention shown in FIG. 12.

Referring to FIGS. 12 and 13, there is shown a wiper deicing device 200 according to a third preferred embodiment of the invention. The wiper deicing device 200 according to the third preferred embodiment is identical to the device 1 according to the first embodiment except that the third embodiment includes a manual mechanism rather than a motorized mechanism for raising and lowering the reciprocatable member 20. Like components in the first and third embodiments are identified with like reference numerals.

The manual actuating mechanism according to the third preferred embodiment includes a pivoting lever 216 pivotally supported on a bracket 215 mounted to the vehicle body 9, a handle 214 disposed within the passenger compartment of the vehicle for being gripped and pulled by a driver, and a cable 218 operatively interconnecting the pivoting lever 216 and the handle 214. The lever 216 has a smooth upper surface upon which the wheel 24 at the lower end of the reciprocatable member 20 is rollably supported. In use, the lever 216 is normally in the position shown by broken lines in FIG. 12 because the weight of the wiper 2 and the force of the spring (not shown) within the guide bracket 22 pushes downwardly on the lever. When it is desired to deice the wiper 2, the driver merely pulls on the handle 214 so as to pivot the lever 216 to the position shown in solid lines in FIG. 12, thereby raising the reciprocatable member 20 and the wiper 2 to raised positions thereof, after which the driver releases the handle 214 so that the wiper 2 is quickly moved downwardly to impact against the window 6 under the force of gravity and the spring within the bracket 22. The driver may then repeat such operation of pulling and releasing the handle 214 as often as necessary or desired to disengage ice from the blade portion 3 of the wiper 2.

Indicated at 212 is a pulley for guiding the cable 218 and for reducing the amount of force necessary on the part of the driver to pull the handle 214, and a bracket for supporting the pulley 212 is indicated at 213.

While the third preferred embodiment is shown as being connected to only a single wiper 2, it will be understood that this embodiment could be modified to deice a pair of wipers 2 with appropriate modification of the manual actuating means.

Although there have been described what are present considered to be three preferred embodiments of the invention, it will be understood that the invention can be embodied in other specific forms without departing from the spirit or essential characteristics thereof. For example, while cam, gear and lever mechanisms have been disclosed for actuating the reciprocating movements of the reciprocatable member 20, 120, other appropriate mechanisms could be used to actuate the reciprocating movements such as a crank shaft with a link member connected between the crankshaft and a lower end of the reciprocatable member. The present embodiment are, therefore, to be considered in all aspects as illustrative, and not restrictive. The scope of the invention is indicated by the appended claims rather than by the foregoing description.

I claim:

1. A wiper deicing device for a vehicle having a window and a window wiper, comprising:

means for impacting the window wiper against the window at a velocity sufficient to disengage ice and snow from the wiper, including a reciprocatable member operatively engageable with the wiper; and means for stabilizing movement of said reciprocatable member;

said impacting means including powered actuating means for moving the reciprocatable member to disengage the wiper from the window and reengage the wiper with the window, the powered actuating means disengages the wiper from the window at a first rate and reengages the wiper with the window at a second, higher rate; and said stabilizing means comprising a fixed guide member disposed about said reciprocatable member for substantially enclosing same, and means associated with said fixed guide member and said reciprocatable shaft for preventing rotational movement of the reciprocatable member about a longitudinal axis thereof.

2. A wiper deicing device according to claim 1, wherein said actuating means includes a cam mechanism for moving said reciprocatable member, the cam mechanism including a powered cam and a cam roller provided on one end of said reciprocatable member for engaging the powered cam.

3. A wiper deicing device according to claim 1, wherein said wiper includes a support arm portion and a blade portion pivotally connected to the arm portion, and said device further including means for restricting pivoting movement of the blade portion of the wiper relative to the arm portion of the wiper.

4. A wiper deicing device according to claim 3, wherein said restricting means comprises a clip connectible to the wiper for restricting the pivoting movement of the blade portion of the wiper.

5. A wiper deicing device according to claim 4, wherein said clip is connectible between the blade portion of the wiper and a support arm portion of the wiper.

6. A wiper deicing device according to claim 1, further including an enlarged surface area engagement member connected to an arm portion of the wiper for being engaged by said reciprocatable member.

7. A wiper device according to claim 1, wherein said vehicle has a pair of window wipers, said impacting means includes a pair of said reciprocatable members, a pair of said cam mechanisms for driving the reciprocatable members, respectively, and a single motor which simultaneously activates said cam mechanisms to impact said pair of wipers.

8. A wiper system including a deicing device for a vehicle having a window, said system comprising:

a wiper assembly including a wiper arm and an elongated wiper blade pivotally supported on said wiper arm for pivoting movement relative to the window about a pivot axis, said wiper blade having first and second elongated portions extending in opposite directions from said pivot axis;

a reciprocatable member operatively engageable with the wiper arm for selectively disposing the wiper blade in engagement or out of engagement with the window;

means for moving the reciprocatable member between a first position in which the wiper blade is disposed in engagement with the window and a second position in which the wiper blade is disposed out of engagement with the window; and means for restricting pivoting movement of the wiper blade of the wiper assembly relative to the wiper arm of the wiper assembly, said restricting means comprising a spring clip, said spring clip having an intermediate portion receiving an end of said wiper arm therein, said intermediate portion having first and second spring arm portions extending therefrom in opposite directions, said spring arm portions being in engagement with said elongated portions of said wiper blade, respectively, to resiliently bias said wiper blade about said pivot axis to a predetermined orientation with respect to said wiper arm.

9. A wiper deicing device according to claim 8, wherein said moving means rapidly moves the reciprocatable member from the second position to the first position so that the wiper impacts against the window with a jarring force sufficient to disengage ice and snow from the wiper.

10. A wiper deicing device according to claim 8, wherein said moving means is powered, said powered moving means moves said reciprocatable member from said first position thereof to said second position thereof at a first rate, and said powered moving means moves said reciprocatable member from said second position thereof to said first position thereof at a second, higher rate.

11. A wiper system including a deicing device according to claim 8, further including means for stabilizing movement of said reciprocatable member, and an enlarged surface area engagement member provided on the wiper arm of said wiper for being operatively engaged by said reciprocatable member, said engagement member covers said reciprocating member in the first position thereof.

12. A wiper system according to claim 8, further including an engagement member connected to the wiper arm of the wiper assembly and projecting therefrom, said reciprocatable member engages said engagement member for moving the wiper assembly, and said engagement member covers the end portion of the reciprocatable member when the reciprocatable member is in said first position thereof.

* * * * *